(12) United States Patent
Ghazal (10) Patent No.: US 7,127,457 B1
(45) Date of Patent: Oct. 24, 2006

(54) METHOD AND SYSTEM FOR EXECUTING DATABASE QUERIES

(75) Inventor: Ahmad Said Ghazal, Redondo Beach, CA (US)

(73) Assignee: NCR Corp., Dayton, OH (US)

( * ) Notice: Subject to any disclaimer, the term of this patent is extended or adjusted under 35 U.S.C. 154(b) by 481 days.

(21) Appl. No.: 10/696,333

(22) Filed: Oct. 29, 2003

(51) Int. Cl.
*G06F 17/30* (2006.01)
*G06F 7/00* (2006.01)

(52) U.S. Cl. .............................. 707/4; 707/3
(58) Field of Classification Search ................ 707/1–6, 707/7, 100
See application file for complete search history.

(56) References Cited

U.S. PATENT DOCUMENTS

| | | | | |
|---|---|---|---|---|
| 5,469,568 A | * | 11/1995 | Schiefer et al. | 707/2 |
| 6,697,794 B1 | * | 2/2004 | Milby | 707/2 |
| 6,834,279 B1 | * | 12/2004 | Chiang | 707/2 |
| 2004/0068489 A1 | * | 4/2004 | Dettinger et al. | 707/3 |
| 2004/0073539 A1 | * | 4/2004 | Dettinger et al. | 707/3 |

* cited by examiner

*Primary Examiner*—Don Wong
*Assistant Examiner*—Hung Tran Vy
(74) *Attorney, Agent, or Firm*—Baker Botts, LLP (57) ABSTRACT

A method, computer program, and computer network are disclosed for executing database queries. The method includes identifying a first set of conditions corresponding to a selected step for executing a query. A second set of conditions corresponding to one or more steps for executing the query that feed the selected step is identified. Each condition in the first set is checked for mathematical redundancy, including redundancy without equivalency, with regard to the other conditions in the union of the conditions corresponding to the selected step and the conditions in the second set. Each condition in the first set that is redundant is included in a third set. If there is only one condition in the third set, an identifier of the one condition is stored.

27 Claims, 8 Drawing Sheets

METHOD AND SYSTEM FOR EXECUTING DATABASE QUERIES

BACKGROUND

Data stored in database systems often is accessed by users who provide queries defining the type of information that they would like to receive. For example, a query in a database that contains employee information could define a range of dates and request information on all employees who started to work for the company in the specified time range. Often, there are a large number of possible approaches that will each produce the information requested by the query. Each approach involves a series of database access steps. For example, a query seeking the last names of all employees who sold more than 100 products in a particular month could require information from different tables stored in the database. One table that includes a record for each product sold including the employee number of the person that sold it could be used to determine the employee numbers with more than 100 sales. Another table could be used to determine the last name that corresponds to each of those employee numbers. The time and system resources expended to provide the query answer can depend on the order in which those steps are performed.

One conventional way to choose the order in which steps will be performed to execute a database query includes estimating the time and system resources that will be necessary for each possible series of steps. The series of steps with the lowest cost can then be selected. Data to be retrieved or manipulated by a step is often chosen in accordance with conditions. For example, retrieving data regarding a certain employee might involve using a condition that the employee_number field be equal to the employee's actual number. Other examples of conditions include a comparison condition, e.g., all employees who started before a particular date, or a range condition, e.g., all products costing between $19 and $99. The database system can determine the conditions corresponding to a step based on the query and the analysis of that query. The database system employees those conditions both to estimate the cost of a particular series of steps and to actually carry out the series of steps chosen to execute the query.

SUMMARY

In general, in one aspect, the invention features a method for executing database queries. The method includes identifying a first set of conditions corresponding to a selected step for executing a query. A second set of conditions corresponding to one or more steps for executing the query that feed the selected step is identified. Each condition in the first set is checked for mathematical redundancy, including redundancy without equivalency, with regard to the other conditions in the union of the conditions corresponding to the selected step and the conditions in the second set. Each condition in the first set that is redundant is included in a third set. If there is only one condition in the third set, an identifier of the one condition is stored.

Implementations of the invention may include one or more of the following. An estimate of the cost of performing the steps can be performed without taking into account any identified conditions. When the third set contains multiple conditions, the conditions can be sorted with only the initial condition being identified. Once a condition is identified, redundancy can be checked for the remaining conditions without the identified condition. The query can be executed without evaluating any of the identified conditions.

In general, in another aspect, the invention features a computer program for executing database inquires. The program includes executable instructions that cause a computer to identify a first set of conditions corresponding to a selected step for executing a query. A second set of conditions corresponding to one or more steps for executing the query that feed the selected step is identified. Each condition in the first set is checked for mathematical redundancy, including redundancy without equivalency, with regard to the other conditions in the union of the conditions corresponding to the selected step and the conditions in the second set. Each condition in the first set that is redundant is included in a third set. If there is only one condition in the third set, an identifier of the one condition is stored.

In general, in another aspect, the invention features a database system for executing database queries. The database system includes one or more nodes; a plurality of CPUs, each of the one or more nodes providing access to one or more CPUs; and a plurality of virtual processes, each of the one or more CPUs providing access to one or more virtual processes, each virtual process configured to manage data, including rows organized in tables, stored in one of a plurality of data-storage facilities. The database system also includes an optimizer that is configured to identify a first set of conditions corresponding to a selected step for executing a query. A second set of conditions corresponding to one or more steps for executing the query that feed the selected step is identified. Each condition in the first set is checked for mathematical redundancy, including redundancy without equivalency, with regard to the other conditions in the union of the conditions corresponding to the selected step and the conditions in the second set. Each condition in the first set that is redundant is included in a third set. If there is only one condition in the third set, an identifier of the one condition is stored.

DETAILED DESCRIPTION

Figure 1:
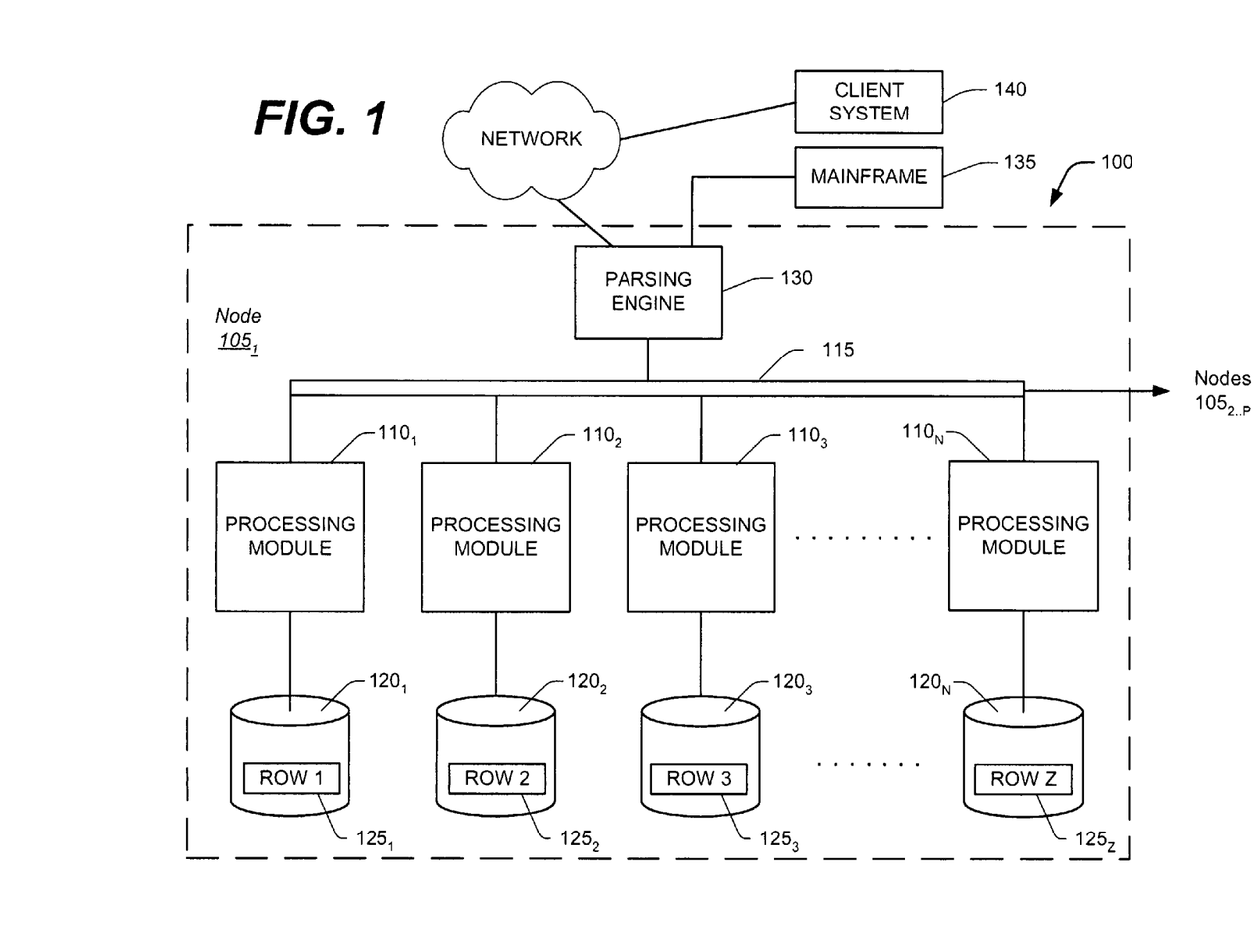
FIG. 1 is a block diagram of a node of a parallel processing database system.

The query execution technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
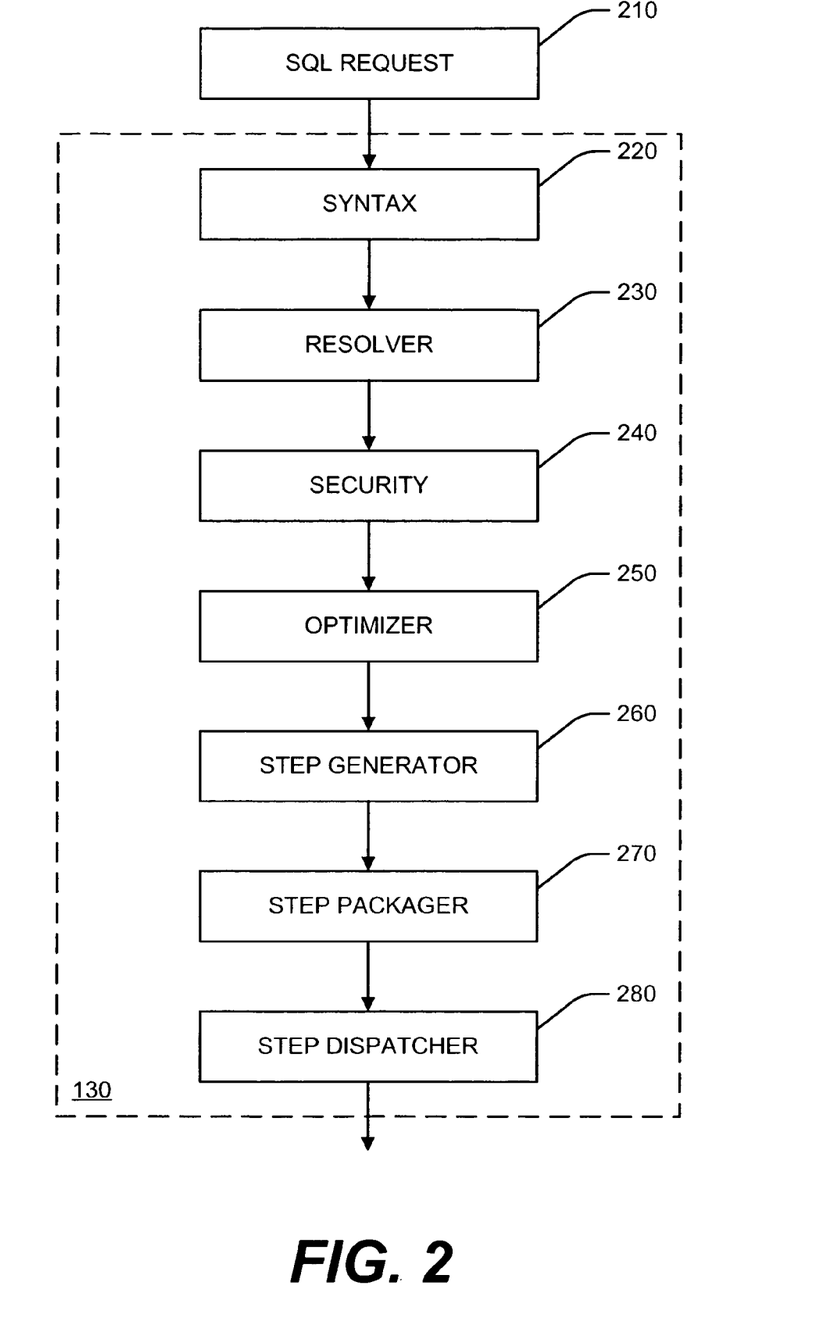
FIG. 2 is a block diagram of a parsing engine.

FIG. 2 components of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. The cardinality of temporary results or sub-query results refers to the cost. A temporary result that requires a large amount of system resources to generate has high cardinality.

After estimating the costs associated with potential query execution plans, the optimizer 250 chooses the plan that has the lowest estimated cost. The more accurate the estimates of cardinality for particular execution plans, the more likely the optimizer 250 is to choose the correct plan. The optimizer 250 can access statistics describing the information stored in the database to help estimate the cardinality of conditions and temporary results corresponding to steps in query execution plans.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for reach query can result in longer wait times for every user.

Figure 3:
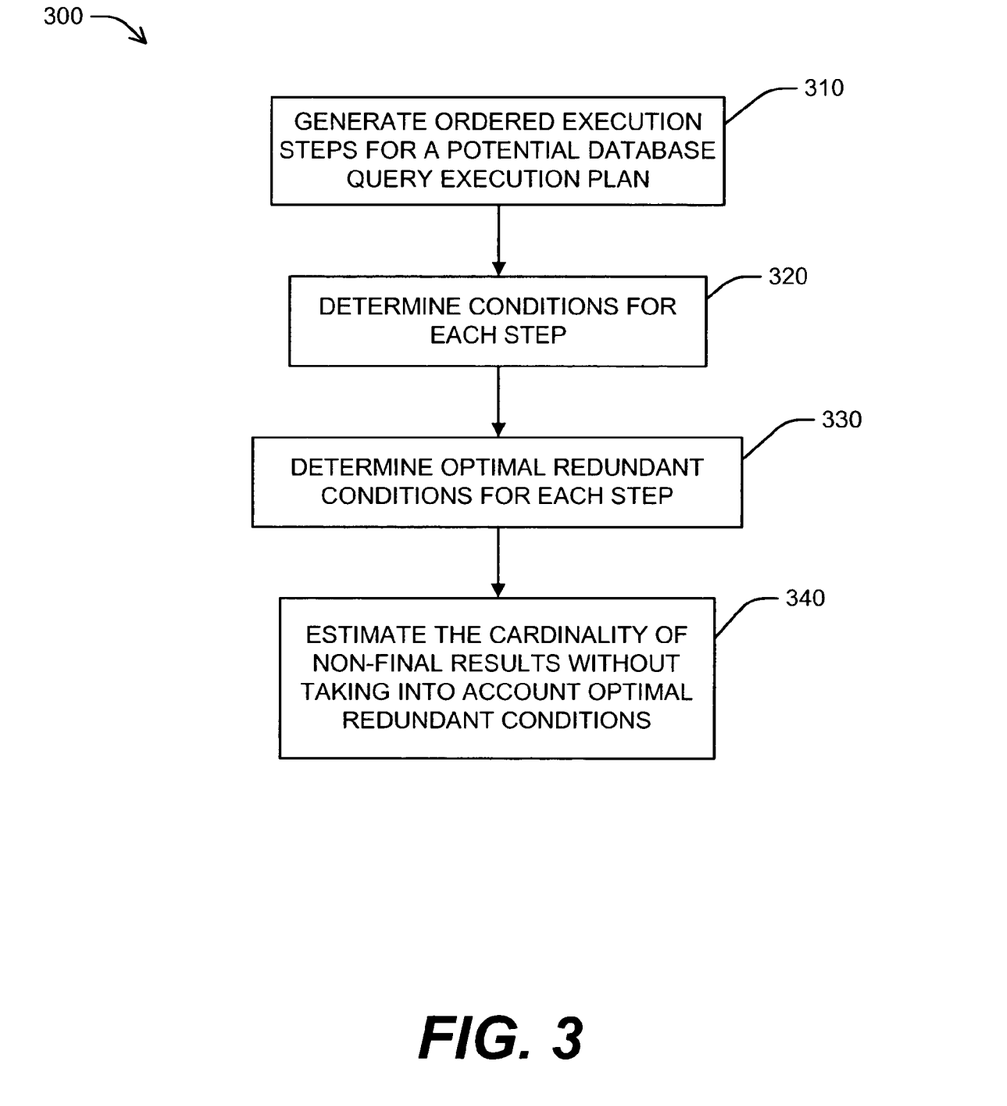
FIG. 3 is a flow chart of one method for estimating the cost of a database query execution plan.
Figure 5:
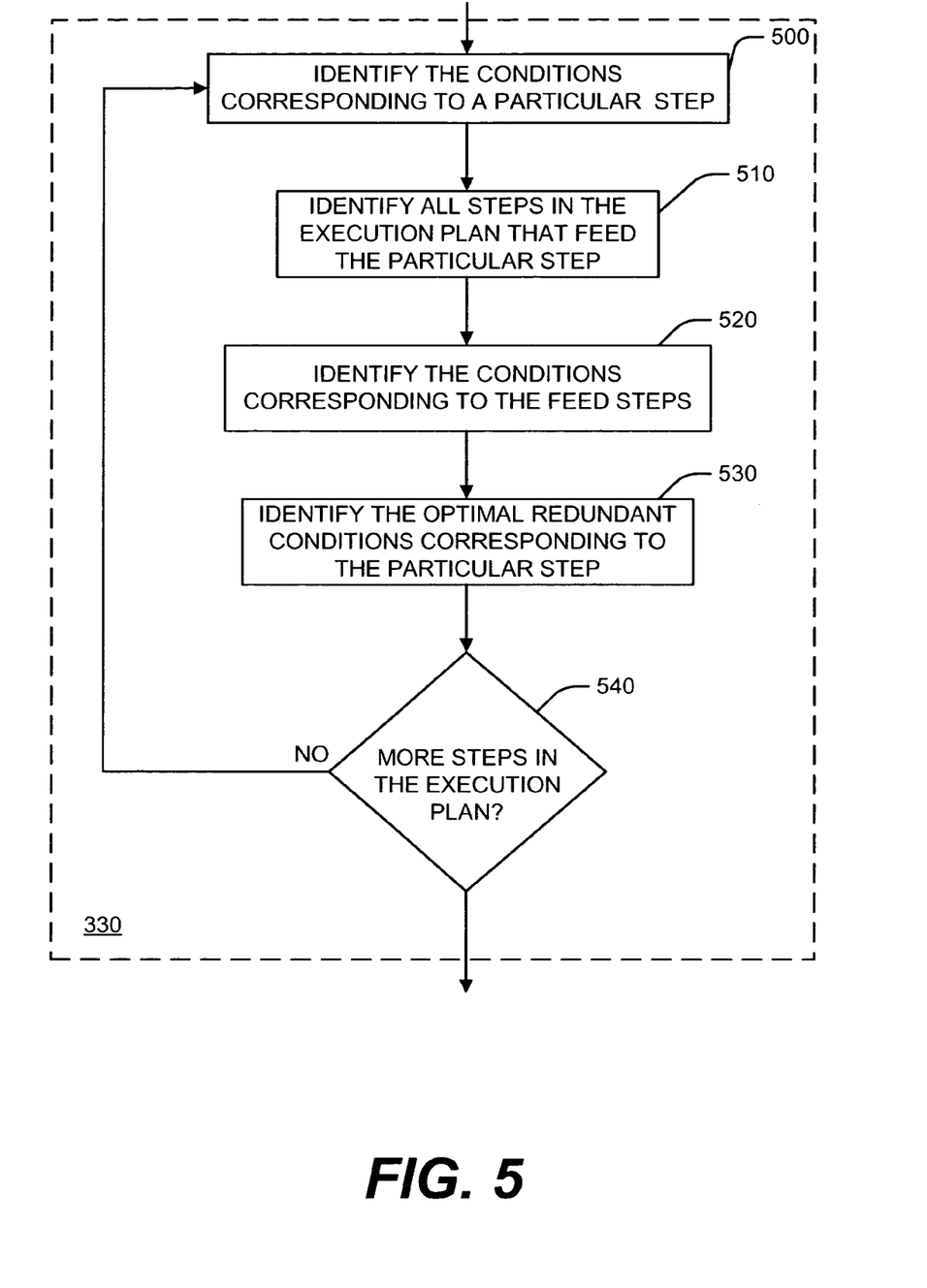
FIG. 5 is a flow chart of one method of identifying conditions for a query execution step and its feed steps.
Figure 6:
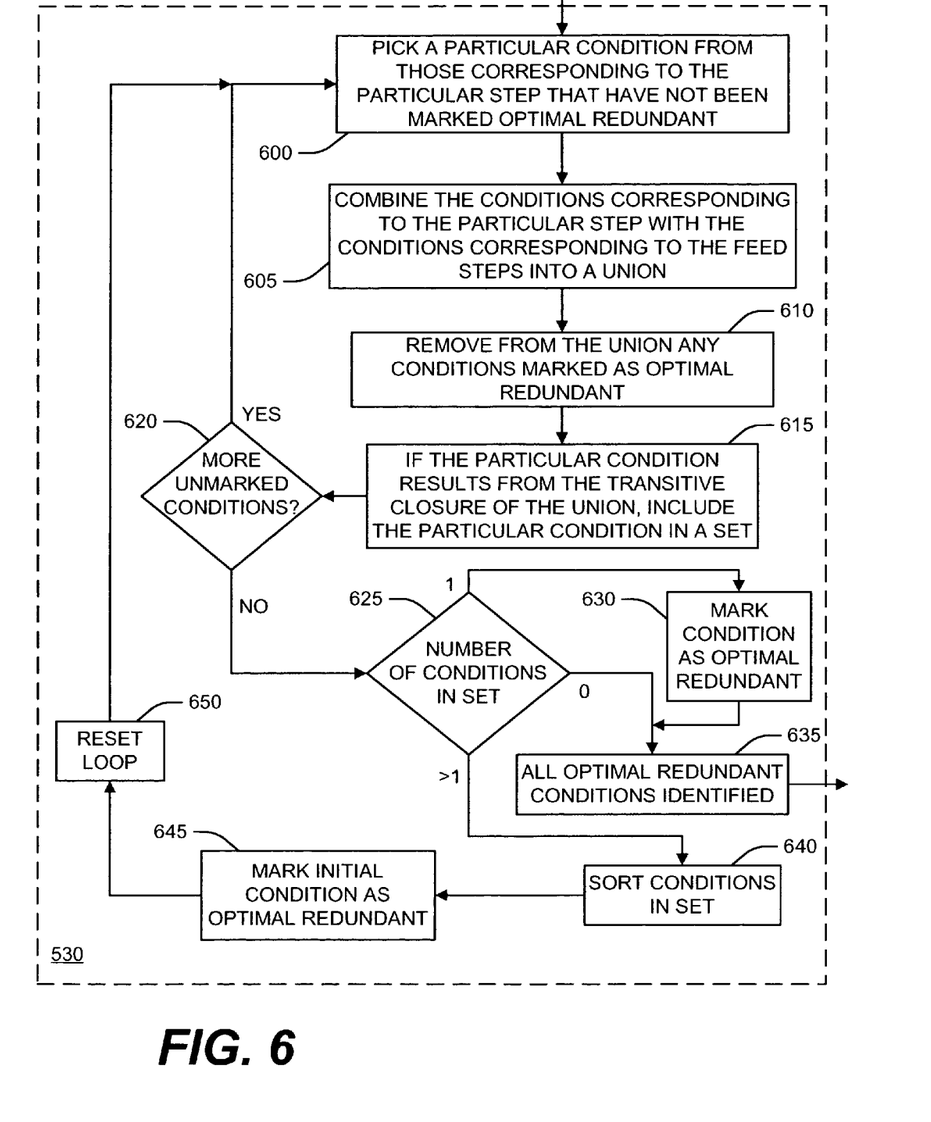
FIG. 6 is a flow chart of one method of identifying optimal redundant conditions for a query execution step.

FIG. 3 is a flow chart of one method for estimating the cardinality of non-final results for an execution plan 300. First, ordered execution steps for a potential database query execution plan are generated 310. The conditions corresponding to each step are determined 320. Conditions that are optimal redundant for a particular step are determined 330. FIGS. 5 and 6 discuss the process of determining optimal redundancy in more detail. When several conditions are individually redundant, but are not all collectively redundant, the optimally redundant condition(s) are those that result in the most accurate cardinality estimation when removed from the estimation process. An optimal redundant condition can also be referred to as a selectivity redundant condition. For example, if a query step includes three conditions: price=$10; cost=$5; and cost=50% (price), each of the three is redundant with regard to the other two. Only one can be removed, however, without losing information. Once the one or more conditions that are optimally redundant are determined, the cardinalities can be estimated without taking into account the optimal redundant conditions.

Figure 4:
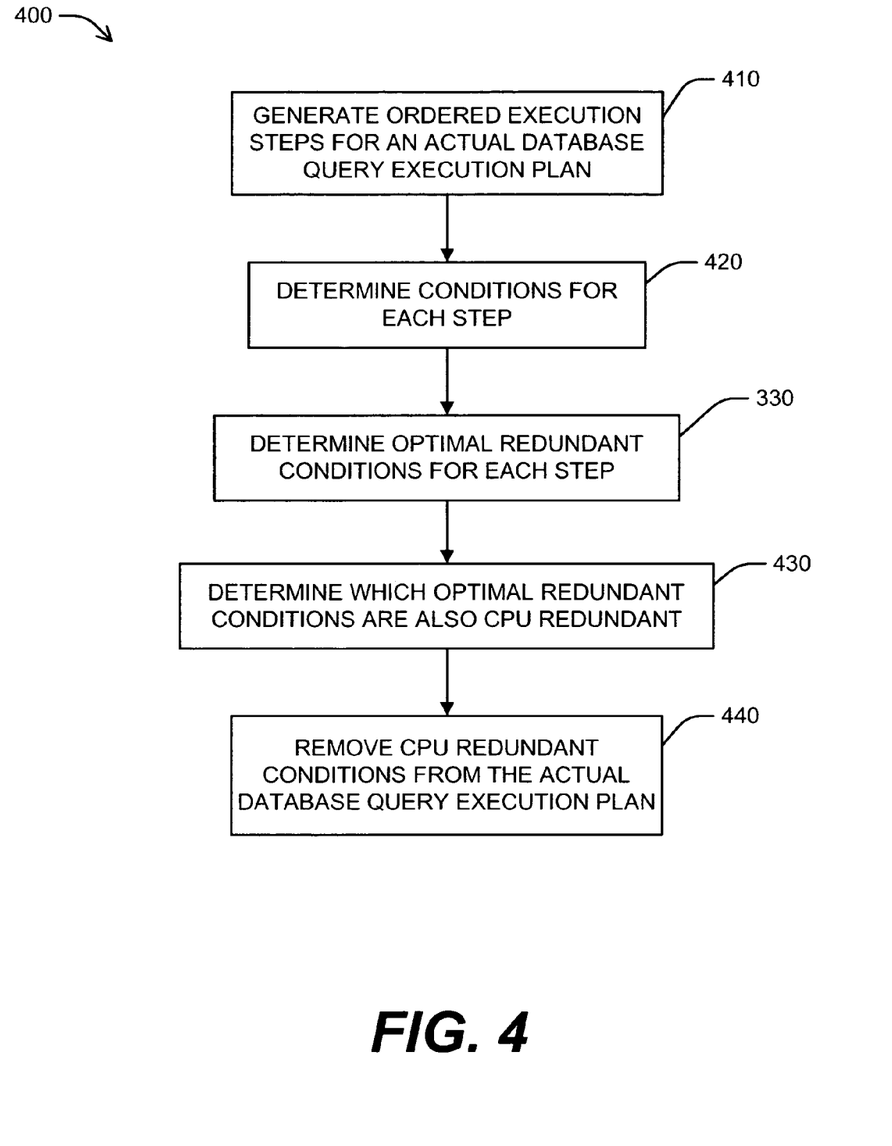
FIG. 4 is a flow chart of one method for executing a database query execution plan.
Figure 7:
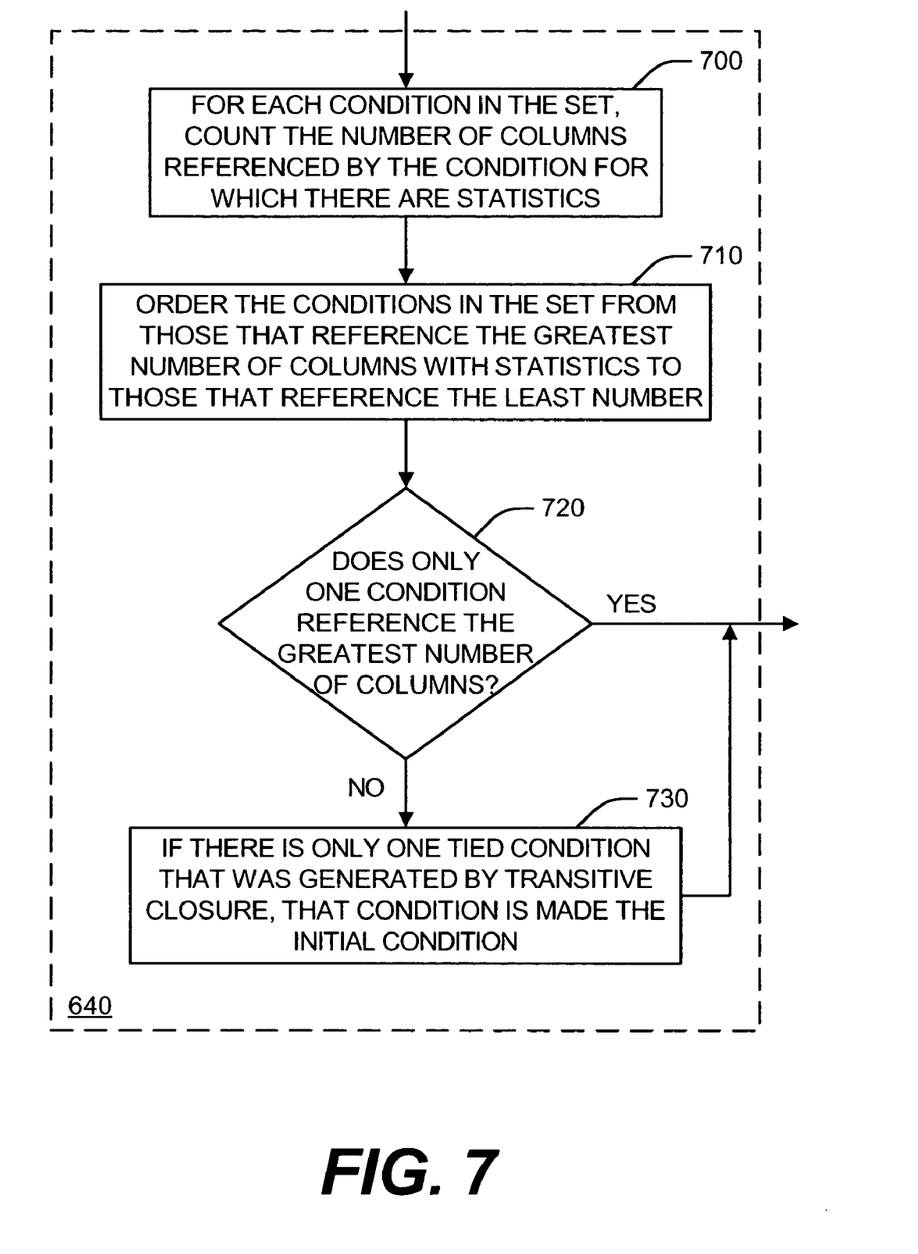
FIG. 7 is a flow chart of one method of sorting redundant conditions corresponding to a query execution step.

FIG. 4 is a flow chart of one method for executing a query 400. First, ordered execution steps for an actual database query execution plan are generated 410. The conditions corresponding to each step are determined 420. Conditions that are optimal redundant for a particular step are determined 330. FIGS. 5 and 6 illustrate the process of determining optimal redundancy in more detail. Conditions that are CPU redundant as well as being optimal redundant are determined 430. FIG. 7 illustrates the process of determining CPU redundancy is more detail. Once the one or more conditions that are CPU redundant are determined, the query can be executed without evaluating those conditions.

FIG. 5 is a flow chart of one method of identifying conditions for a query execution step and its feed steps 330. First, one step is chosen and the conditions corresponding to that step are identified 500. All the steps that feed into the particular step are then identified 510 along with the conditions that correspond to those steps 520. From the conditions corresponding to the particular step, the optimal redundant conditions are picked out 530. FIG. 6 illustrates the process of determining optimal redundant conditions for a particular step in more detail. If there are more steps in the potential or actual execution plan 540, another step is chosen 500. Otherwise, all of the optimal redundant conditions for the steps have been identified.

FIG. 6 is a flow chart of one method of identifying optimal redundant conditions for a query execution step 530. One of the conditions that has not been marked as optimal redundant is chosen 600 to be evaluated. All other conditions from the current step and all steps that feed it are combined in a union 605, except that conditions already marked as optimal redundant are excluded 610. The condition being evaluated is checked to see if it is redundant, including redundancy other than equivalency, with the union of conditions and it is included in a set if it is redundant 615. In one embodiment, a transitive closure function is performed on the union to determine whether the condition being evaluated results. If there are additional unmarked conditions 620, the process of picking out the redundant conditions is repeated 620. Once all of the redundant conditions are included in the set, the number of conditions in the set becomes important. If no conditions were redundant 625, then there are no optimal redundant conditions 635. If there is one condition in the set 625, that condition is marked as optimal redundant (or selectivity redundant) 630 and no more conditions are evaluated 635. If more than one condition is redundant 625, the conditions are sorted 640. The sorting step is discussed in more detail in FIG. 7. Once sorted, the initial condition is marked as optimal redundant (selectivity redundant) 645. The condition loop is then reset 650 so that all the unmarked conditions will be checked for redundancy again in view of the newly marked conditions in steps 600–620. As fewer unmarked conditions corresponding to the step remain, the method will eventually result in no redundant conditions or only one.

FIG. 7 is a flow chart of one method of sorting redundant conditions corresponding to a query execution step 640. The sorting function sorts redundant conditions according to their importance in relation to selectivity. The ordering method is based on statistics, i.e. if the columns in the condition have collected statistics on them or not. A simple count of the number of columns that have collected statistics can be used 700. The conditions are then sorted in order of that number 710. In case of a tie 720, the condition that was produced by transitive closure will have the high sort order 730. If two conditions tie in both measures then their ordering can be either way.

Figure 8:
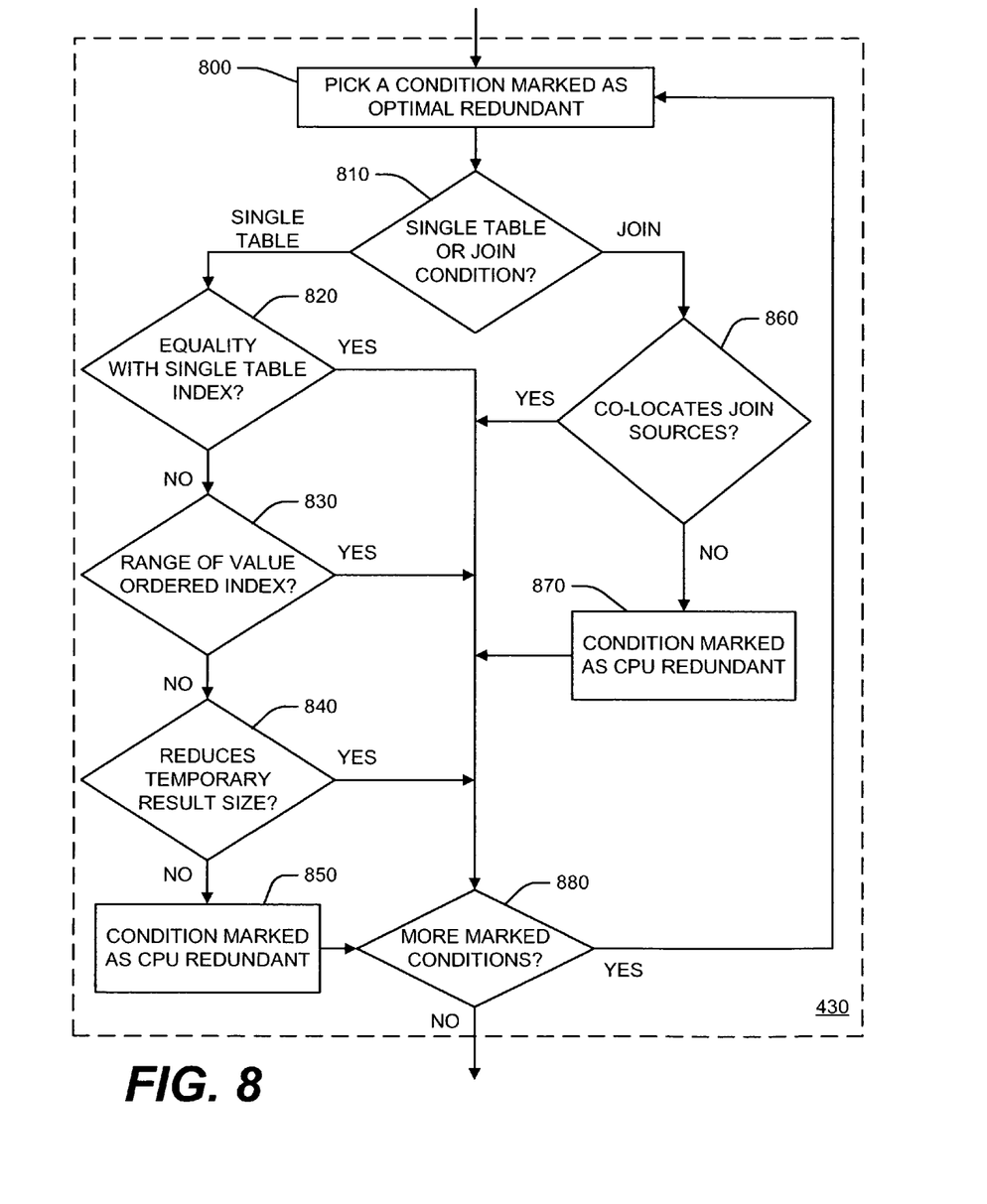
FIG. 8 is a flow chart of one method of identifying optimal redundant conditions for a query execution step that are CPU redundant.

FIG. 8 is a flow chart of one method of identifying optimal redundant conditions for a query execution step that are CPU redundant 430. Ideally, to find out if a mathematically redundant condition is also CPU redundant the binary join costing is computed with and without that condition. If it less costly without the condition then the condition is CPU redundant. If this method is used and more than one CPU redundant condition is found then the cost could be used as the sorting criteria. This method is not practical because it is costly (from optimizer 250 point of view) to compute the cost of binary join planning. Also, the binary join costing may not be accurate in terms of the CPU cost of applying a condition. That is why heuristics will be to identify CPU redundant conditions and also rank them in terms of overhead.

The heuristics used to find if an optimal redundant condition is also CPU redundant are the following. If the condition is a single table condition, then it is CPU redundant only if none of the following two qualifications are true. (1) The condition does not provide an access path to the table. Examples of access paths if the condition is PI (primary index)=constant which provides a single AMP, single hash access, SI (secondary index)=constant which provides access to the table through a secondary index. I (index) in a range comparison where the index is value ordered. Note that whether the condition provides an access path to the table can be determined by looking at how the binary join is done by the optimizer 250. (2) The condition does not reduce the size of a temporary result. For example, assume that a table named lineitem is hashed by a column named 1_partkey and a table named ordertb1 is hashed by a column named o_orderkey, consider the binary join between lineitem and ordertb1. Assume that the binary join method found by the optimizer 250 is to redistribute lineitem to join with ordertb1. The condition 1_orderkey=4 is applied to lineitem prior to re-distribution. Note that 1_orderkey=4 does not provide an access path (no indexes on 1_orderkey) but still it is not CPU redundant. The reason is that it may filter out rows from lineitem prior to the join.

If the condition is a join condition, then it is CPU redundant if it is not useful in co-locating the sources of the join. For example, 1_orderkey=o_orderkey is selectivity redundant because it can be derived using 1_orderkey=4 and o_orderkey=4. If either 1_orderkey or o_orderkey is a primary index of its table, then that helps the optimizer 250 to minimize data movement (duplication or re-distribution). Also, the knowledge of primary index helps the optimizer 250 avoid unnecessary sorting. After the binary join is found whether the condition helped in co-location can be determined. For example, if lineitem or ordertb1 are duplicated or both are redistributed then the condition was not useful in co-locating the tables.

A condition that was marked as optimal redundant is picked 800. Depending on whether the condition is a single table condition or a join condition 810, a different evaluation is applied. If a single table condition is not an equality with an index 820, is not a range of a value ordered index 830, and does not reduce temporary result size 840, then the condition is marked as CPU redundant 850. Otherwise, it is not so marked. If a join condition does not co-locate join sources 860, then it is marked CPU redundant 870. Otherwise, it is not so marked. In either case, all the optimal redundant conditions are evaluated 880.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing database queries including identifying redundant conditions, comprising the steps of:
   (a) identifying a first set of conditions corresponding to a selected step for executing a query;

(b) identifying a second set of conditions corresponding to one or more steps for executing the query that feed the selected step;

(c) for each condition in the first set, checking whether the condition is mathematically redundant, including redundant without being equivalent, with the conditions in a union of any other conditions corresponding to the selected step and the conditions in the second set, (d) including each condition in the first set that is redundant as checked in step (c) in a third set;

(e) if there is only one condition in the third set after performing step (d), storing an identifier of the one condition;

(f) calculating a cardinality of the selected step without considering any condition with a stored identifier; and (g) executing the query based at least in part on the cardinality to produce a query result.

2. The method of claim 1, further comprising the steps of:

(d1) if there are a plurality of conditions in the third set after performing step (d), performing steps (d2) and (d3);

(d2) sorting the conditions in the third set to identify an initial condition; and (d3) storing an identifier of the initial condition.

3. The method of claim 1, wherein step (e) includes ceasing storage of identifiers of additional conditions and the union in step (c) does not include conditions with stored identifiers, and further comprising the steps of:

(e1) if there are no conditions in the third set after performing step (d), ceasing storage of identifiers of additional conditions;

(e2) if there are a plurality of conditions in the third set after performing step (d), performing steps (e3)–(e6);

(e3) sorting the conditions in the third set to identify an initial condition;

(e4) storing an identifier of the initial condition;

(e5) modifying the first set of conditions to include only the conditions in the third set that are not the initial condition; and (e6) starting again at step (c).

4. The method of claim 3, further comprising the step of performing a cardinality calculation without considering conditions with stored identifiers.

5. The method of claim 1 where the one or more steps for executing the query that feed the selected step include all the steps that feed the selected step.

6. The method of claim 1 further comprising the step of executing the query without applying conditions with stored identifiers.

7. The method of claim 1 further comprising the steps of:

(e1) for each condition with a stored identifier that is a single table condition, performing steps (e2)–(e4);

(e2) if the condition is an equality with an index of the single table, identifying that condition as CPU effective;

(e3) if the condition is a range comparison of a value ordered index of the single table, identifying that condition as CPU effective;

(e4) if the condition reduces the size of a temporary result in the execution of the query, identifying that condition as CPU effective; and (e5) executing the query without applying conditions with stored identifiers that are not identified as CPU effective.

8. The method of claim 7 where identifying a condition as CPU effective comprises not identifying the condition as CPU redundant.

9. The method of claim 1 further comprising the steps of:

(e1) for each condition with a stored identifier that is a join condition, performing step (e2);

(e2) if the condition is useful in co-locating the sources of the join, identifying that condition as CPU effective;

(e3) executing the query without applying conditions with stored identifiers that are not identified as CPU effective.

10. A computer program, stored on a tangible storage medium, for executing database queries, the program including executable instructions that cause a computer to:

(a) identify a first set of conditions corresponding to a selected step for executing a query;

(b) identify a second set of conditions corresponding to one or more steps for executing the query that feed the selected step;

(c) for each condition in the first set, check whether the condition is mathematically redundant, including redundant without being equivalent, with the conditions in a union of any other conditions corresponding to the selected step and the conditions in the second set, (d) include each condition in the first set that is redundant as checked in step (c) in a third set; and (e) if there is only one condition in the third set after performing step (d), store an identifier of the one condition;

(f) calculate a cardinality of the selected step without considering any condition with a stored identifier; and (g) execute the query based at least in part on the cardinality to produce a query result.

11. The program of claim 10, further including executable instructions that cause the computer to:

(d1) if there are a plurality of conditions in the third set after performing step (d), perform steps (d2) and (d3);

(d3) sort the conditions in the third set to identify an initial condition; and (d3) store an identifier of the initial condition.

12. The program of claim 10, wherein step (e) includes ceasing to store identifiers of additional conditions and the union in step (c) does not include conditions with stored identifiers, and further including executable instructions that cause the computer to:

(e1) if there are no conditions in the third set after performing step (d), cease to store identifiers of additional conditions;

(e2) if there are a plurality of conditions in the third set after performing step (d), perform steps (e3) and (e4);

(e3) sort the conditions in the third set to identify an initial condition;

(e4) store an identifier of the initial condition;

(e5) modify the first set of conditions to include only the conditions in the third set that are not the initial condition; and (e6) start again at step (c).

13. The program of claim 12, further including executable instructions that cause the computer to perform a cardinality calculation without considering conditions with stored identifiers.

14. The program of claim 10 where the one or more steps for executing the query that feed the selected step include all the steps that feed the selected step.

15. The program of claim 10 further including executable instructions that cause the computer to execute the query without applying conditions with stored identifiers.

16. The program of claim 10 further including executable instructions that cause the computer to:
   (e1) for each condition with a stored identifier that is a single table condition, perform steps (e2)–(e4);
   (e2) if the condition is an equality with an index of the single table, identify that condition as CPU effective;
   (e3) if the condition is a range comparison of a value ordered index of the single table, identify that condition as CPU effective;
   (e4) if the condition reduces the size of a temporary result in the execution of the query, identify that condition as CPU effective; and
   (e5) execute the query without applying conditions with stored identifiers that are not identified as CPU effective.

17. The program of claim 16 where identifying a condition as CPU effective comprises not identifying the condition as CPU redundant.

18. The program of claim 10 further including executable instructions that cause the computer to:
   (e1) for each condition with a stored identifier that is a join condition, perform step (e2);
   (e2) if the condition is useful in co-locating the sources of the join, identify that condition as CPU effective;
   (e3) execute the query without applying conditions with stored identifiers that are not identified as CPU effective.

19. A database system for executing database queries, comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data, including rows organized in tables, stored in one of a plurality of data-storage facilities; and
   an optimizer configured to:
   (a) identify a first set of conditions corresponding to a selected step for executing a query;
   (b) identify a second set of conditions corresponding to one or more steps for executing the query that feed the selected step;
   (c) for each condition in the first set, check whether the condition is mathematically redundant, including redundant without being equivalent, with
   the conditions in a union of
   any other conditions corresponding to the selected step and the conditions in the second set,
   (d) include each condition in the first set that is redundant as checked in step (c) in a third set;
   (e) if there is only one condition in the third set after performing step (d), store an identifier of the one condition;
   (f) calculate a cardinality of the selected step without considering any condition with a stored identifier; and
   (g) execute the query based at least in part on the cardinality to produce a query result.

20. The database system of claim 19, wherein the optimizer is further configured to:
   (d1) if there are a plurality of conditions in the third set after performing step (d), perform steps (d2) and (d3);
   (d2) sort the conditions in the third set to identify an initial condition; and
   (d3) store an identifier of the initial condition.

21. The database system of claim 19, wherein step (e) includes ceasing to store identifiers of additional conditions and the union in step (c) does not include conditions with stored identifiers, and wherein the optimizer is further configured to:
   (e1) if there are no conditions in the third set after performing step (d), cease to store identifiers of additional conditions;
   (e2) if there are a plurality of conditions in the third set after performing step (d), perform steps (e3) and (e4);
   (e3) sort the conditions in the third set to identify an initial condition;
   (e4) store an identifier of the initial condition;
   (e5) modify the first set of conditions to include only the conditions in the third set that are not the initial condition; and
   (e6) start again at step (c).

22. The database system of claim 21, wherein the optimizer is further configured to perform a cardinality calculation without considering conditions with stored identifiers.

23. The database system of claim 19 where the one or more steps for executing the query that feed the selected step include all the steps that feed the selected step.

24. The database system of claim 19 wherein the optimizer is further configured to execute the query without applying conditions with stored identifiers.

25. The database system of claim 19 wherein the optimizer is further configured to:
   (e1) for each condition with a stored identifier that is a single table condition, perform steps (e2)–(e4);
   (e2) if the condition is an equality with an index of the single table, identify that condition as CPU effective;
   (e3) if the condition is a range comparison of a value ordered index of the single table, identify that condition as CPU effective;
   (e4) if the condition reduces the size of a temporary result in the execution of the query, identify that condition as CPU effective; and
   (e5) execute the query without applying conditions with stored identifiers that are not identified as CPU effective.

26. The database system of claim 25 where identifying a condition as CPU effective comprises not identifying the condition as CPU redundant.

27. The database system of claim 19 wherein the optimizer is further configured to:
   (e1) for each condition with a stored identifier that is a join condition, perform step (e2);
   (e2) if the condition is useful in co-locating the sources of the join, identify that condition as CPU effective;
   (e3) execute the query without applying conditions with stored identifiers that are not identified as CPU effective.

* * * * *